United States Patent [19]

Nuber et al.

[11] Patent Number: 5,703,877
[45] Date of Patent: *Dec. 30, 1997

[54] ACQUISITION AND ERROR RECOVERY OF AUDIO DATA CARRIED IN A PACKETIZED DATA STREAM

[75] Inventors: Ray Nuber, La Jolla; Paul Moroney, Olivenhain; G. Kent Walker, Escondido, all of Calif.

[73] Assignee: General Instrument Corporation of Delaware, Chicago, Ill.

[*] Notice: The term of this patent shall not extend beyond the expiration date of Pat. No. 5,517,250.

[21] Appl. No.: 562,611

[22] Filed: Nov. 22, 1995

[51] Int. Cl.$^6$ .................... H04J 3/06; H04N 7/12
[52] U.S. Cl. .......... 370/395; 370/510; 370/514; 375/366; 348/423; 348/462; 348/466; 348/467
[58] Field of Search .................. 370/389, 395, 370/503, 509, 510, 514, 516; 375/362, 365, 366, 368, 371; 348/423, 461, 462, 464, 466, 467

[56] References Cited

U.S. PATENT DOCUMENTS

| | | | |
|---|---|---|---|
| 5,365,272 | 11/1994 | Siracusa | 348/461 |
| 5,376,969 | 12/1994 | Zdepski | 348/466 |
| 5,467,342 | 11/1995 | Logston et al. | 370/253 |
| 5,517,250 | 5/1996 | Hoogenboom et al. | 348/467 |
| 5,537,409 | 7/1996 | Moriyama et al. | 370/471 |

*Primary Examiner*—Alpus H. Hsu
*Attorney, Agent, or Firm*—Barry R. Lipsitz

[57] ABSTRACT

Audio data is processed from a packetized data stream carrying digital television information in a succession of fixed length transport packets. Some of the packets contain a presentation time stamp (PTS) indicative of a time for commencing the output of associated audio data. After the audio data stream has been acquired, the detected audio packets are monitored to locate subsequent PTS's for adjusting the timing at which audio data is output, thereby providing proper lip synchronization with associated video. Errors in the audio data are processed in a manner which attempts to maintain synchronization of the audio data stream while masking the errors. In the event that the synchronization condition cannot be maintained, for example in the presence of errors over more than one audio frame, the audio data stream is reacquired while the audio output is concealed. An error condition is signaled to the audio decoder by altering the audio synchronization word associated with the audio frame in which the error has occurred.

25 Claims, 4 Drawing Sheets

ACQUISITION AND ERROR RECOVERY OF AUDIO DATA CARRIED IN A PACKETIZED DATA STREAM

BACKGROUND OF THE INVENTION

The present invention relates to a method and apparatus for acquiring audio data from a packetized data stream and recovery from errors contained in such data.

Various standards have emerged for the transport of digital data, such as digital television data. Examples of such standards include the Moving Pictures Experts Group (MPEG) standards and the DigiCipher® II standard proprietary to General Instrument Corporation of Chicago, Ill., U.S.A., the assignee of the present invention. The DigiCipher® II standard extends the MPEG-2 systems and video standards, which are widely known and recognized as transport and video compression specifications specified by the International Standards Organization (ISO) in Document series ISO 13818. The MPEG-2 specification's systems "layer" provides a transmission medium independent coding technique to build bitstreams containing one or more MPEG programs. The MPEG coding technique uses a formal grammar ("syntax") and a set of semantic rules for the construction of bitstreams. The syntax and semantic rules include provisions for demultiplexing, clock recovery, elementary stream synchronization and error handling.

The MPEG transport stream is specifically designed for use with media that can generate data errors. Many programs, each comprised of one or more elementary streams, may be combined into a transport stream. Examples of services that can be provided using the MPEG format are television services broadcast over terrestrial, cable television and satellite networks as well as interactive telephony-based services. The primary mode of information carriage in MPEG broadcast applications will be the MPEG-2 transport stream. The syntax and semantics of the MPEG-2 transport stream are defined in International Organisation for Standardisation, ISO/IEC 13818-1, International Standard, 1994 entitled "Generic Coding of Moving Pictures and Associated Audio: Systems," recommendation H.222, incorporated herein by reference.

Multiplexing according to the MPEG-2 standard is accomplished by segmenting and packaging elementary streams such as compressed digital video and audio into packetized elementary stream (PES) packets which are then segmented and packaged into transport packets. As noted above, each MPEG transport packet is fixed at 188 bytes in length. The first byte is a synchronization byte having a specific eight-bit pattern, e.g., 01000111. The sync byte indicates the beginning of each transport packet.

Following the sync byte is a three-byte field which includes a one-bit transport packet error indicator, a one-bit payload unit start indicator, a one-bit transport priority indicator, a 13-bit packet identifier (PID), a two-bit transport scrambling control, a two-bit adaptation field control, and a four-bit continuity counter. The remaining 184 bytes of the packet may carry the data to be communicated. An optional adaptation field may follow the prefix for carrying both MPEG related and private information of relevance to a given transport stream or the elementary stream carried within a given transport packet. Provisions for clock recovery, such as a program clock reference (PCR), and bitstream splicing information are typical of the information carried in the adaptation field. By placing such information in an adaptation field, it becomes encapsulated with its associated data to facilitate remultiplexing and network routing operations. When an adaptation field is used, the payload is correspondingly shorter in length.

The PCR is a sample of the system time clock (STC) for the associated program at the time the PCR bytes are received at the decoder. The decoder uses the PCR values to synchronize a decoder system time clock (STC) with the encoder's system time clock. The lower nine bits of a 42-bit STC provide a modulo-300 counter that is incremented at a 27 MHz clock rate. At each modulo-300 rollover, the count in the upper 33 bits is incremented, such that the upper bits of the STC represent time in units of a 90 kHz clock period. This enables presentation time stamps (PTS) and decode time stamps (DTS) to be used to dictate the proper time for the decoder to decode access units and to present presentation units with the accuracy of one 90 kHz clock period. Since each program or service carried by the data stream may have its own PCR, the programs can be multiplexed asynchronously.

Synchronization of audio, video and data presentation within a program is accomplished using a time stamp approach. Presentation time stamps (PTSs) and/or decode time stamps (DTSs)are inserted into the transport stream for the separate video and audio packets. The PTS and DTS information is used by the decoder to determine when to decode and display a picture and when to play an audio segment. The PTS and DTS values are relative to the same system time clock sampled to generate the PCRs.

All MPEG video and audio data must be formatted into a packetized elementary stream (PES) formed from a succession of PES packets. Each PES packet includes a PES header followed by a payload. The PES packets are then divided into the payloads of successive fixed length transport packets.

PES packets are of variable and relatively long length. Various optional fields, such as the presentation time stamps and decode time stamps may be included in the PES header. When the transport packets are formed from the PES, the PES headers immediately follow the transport packet headers. A single PES packet may span many transport packets and the subsections of the PES packet must appear in consecutive transport packets of the same PID value. It should be appreciated, however, that these transport packets may be freely multiplexed with other transport packets having different PIDs and carrying data from different elementary streams within the constraints of the MPEG-2 Systems specification.

Video programs are carried by placing coded MPEG video streams into PES packets which are then divided into transport packets for insertion into a transport stream. Each video PES packet contains one or more coded video pictures, referred to as video "access units." A PTS and/or a DTS value may be placed into the PES packet header that encapsulates the associated access units. The DTS indicates when the decoder should decode the access unit into a presentation unit. The PTS is used to actuate the decoder to present the associated presentation unit.

Audio programs are provided in accordance with the MPEG Systems specification using the same specification of the PES packet layer. PTS values may be included in those PES packets that contain the first byte of an audio access unit (sync frame). The first byte of an audio access unit is part of an audio sync word. An audio frame is defined as the data between two consecutive audio sync words, including the preceding sync word and not including the succeeding sync word.

In DigiCipher® II, audio transport packets include one or both of an adaptation field and payload field. The adaptation field may be used to transport the PCR values. The payload field transports the audio PES, consisting of PES headers and PES data. PES headers are used to transport the audio PTS values. Audio PES data consists of audio frames as specified, e.g., by the Dolby® AC-3 or Musicam audio syntax specifications. The AC-3 specifications are set forth in a document entitled Digital Audio Compression (AC-3), ATSC Standard, Doc. A/52, United States Advanced Television Systems Committee. The Musicam specification can be found in the document entitled "Coding of Moving Pictures and Associated Audio for Digital Storage Media at Up to About 1.5 MBIT/s," Part 3 Audio, 11172-3 (MPEG-1) published by ISO. Each syntax specifies an audio sync frame as audio sync word, followed by audio information including audio sample rate, bit rate and/or frame size, followed by audio data.

In order to reconstruct a television signal from the video and audio information carried in an MPEG/DigiCipher® II transport stream, a decoder is required to process the video packets for output to a video decompression processor (VDP) and the audio packets for output to an audio decompression processor (ADP). In order to properly process the audio data, the decoder is required to synchronize to the audio data packet stream. In particular, this is required to enable audio data to be buffered for continuous output to the ADP and to enable the audio syntax to be read for audio rate information necessary to delay the audio output to achieve proper lip synchronization with respect to the video of the same program.

Several events can result in error conditions with respect to the audio processing. These include loss of audio transport packets due to transmission channel errors. Errors will also result from the receipt of audio packets which are not properly decrypted or are still encrypted. A decoder must be able to handle such errors without significantly degrading the quality of the audio output.

The decoder must also be able to handle changes in the audio sample rate and audio bit rate. The audio sample rate for a given audio elementary stream will rarely change. The audio bit rate, however, can often change at program boundaries, and at the start and end of commercials. It is difficult to maintain synchronization to the audio stream through such rate changes, since the size of the audio sync frames is dependent on the audio sample rate and bit rate. Handling undetected errors in the audio stream, particularly in systems where error detection is weak, complicates the tracking of the audio stream through rate changes. When a received bitstream indicates that an audio rate has changed, the rate may or may not have actually changed. If the decoder responds to an indication from the bitstream that the audio rate has changed when the indication is in error and the rate has not changed, a loss of audio synchronization will likely occur. This can result in an audio signal degradation that is noticeable to an end user.

To support an audio sample rate change, the audio clock rates utilized by the decoder must be changed. This process can take significant time, again degrading the quality of the audio output signal. Still further, such a sample rate change will require the audio buffers to be cleared to establish a different sample-rate-dependent lip sync delay. Thus, it may not be advantageous to trust a signal in the received bitstream indicating that the audio sample rate has changed.

With respect to bit rate changes, the relative frequency of such changes compared to undetected errors in the bit rate information will be dominated by whether the receiver has adequate error detection. Thus, it would be advantageous to provide a decoder having two modes of operation. In a robust error detection environment such as for satellite communications or cable media, where error detection is robust, a seamless mode of operation can be provided by trusting a bit rate change indication provided by the data. In a less robust error detection environment, indications of bit rate changes can be ignored, at the expense of requiring resynchronization of the audio in the event that the bit rate has actually changed.

It would be further advantageous to provide an audio decoder in which synchronization to the audio bitstream is maintained when the audio data contains errors. Such a decoder should conceal the audio for those sync frames in which an error has occurred, to minimize the aural impact of audio data errors.

It would be still further advantageous to provide a decoder in which the timing at which audio data is output from the decoder's audio buffer is adjusted on an ongoing basis. The intent of such adjustments would be to insure correct presentation time for audio elementary streams.

The present invention provides methods and apparatus for decoding digital audio data from a packetized transport stream having the aforementioned and other advantages.

SUMMARY OF THE INVENTION

In accordance with the present invention, a method is provided for processing digital audio data from a packetized data stream carrying television information in a succession of fixed length transport packets. Each of the packets includes a packet identifier (PID). Some of the packets contain a program clock reference (PCR) value for synchronizing a decoder system time clock (STC). Some of the packets contain a presentation time stamp (PTS) indicative of a time for commencing the output of associated data for use in reconstructing a television signal. In accordance with the method, the PID's for the packets carried in the data stream are monitored to identify audio packets associated with the desired program. The audio packets are examined to locate the occurrence of at least one audio synchronization word therein for use in achieving a synchronization condition. The audio packets are monitored after the synchronization condition has been achieved to locate an audio PTS. After the PTS is located, the detected audio packets are searched to locate the next audio synchronization word. Audio data following the next audio synchronization word is stored in a buffer. The stored audio data is output from the buffer when the decoder system time clock reaches a specified time derived from the PTS. The detected audio packets are continually monitored to locate subsequent audio PTS's for adjusting the timing at which the stored audio data is output from the buffer on an ongoing basis.

A PTS pointer can be provided to maintain a current PTS value and an address of the buffer identifying where the sync word of an audio frame referred to by the current PTS is stored. In order to provide the timing adjustment, the PTS value in the PTS pointer is replaced with a new PTS value after data stored at the address specified by the PTS pointer has been output from the buffer. The address specified by the PTS pointer is then replaced with a new address corresponding to the sync word of an audio frame referred to by the new PTS value. The output of data from the buffer is suspended when the new buffer address is reached during the presentation process. The output of data from the buffer is recommenced when the decoder's system time clock reaches a specified time derived from the new PTS value.

In an illustrated embodiment, the output of data from the buffer is recommenced when the decoder's system time clock reaches the time indicated by the sum of the new PTS value and an offset value. The offset value provides proper lip synchronization by accounting for any decoder video signal processing delay. In this manner, after the audio and video data has been decoded, the audio data can be presented synchronously with the video data so that, for example, the movement of a person's lips in the video picture will be sufficiently synchronous to the sound reproduced.

The method of the present invention can comprise the further step of commencing a reacquisition of the audio synchronization condition if the decoder's system time clock is beyond the specified time derived from the new PTS value before the output of data from the buffer is recommenced. Thus, if a PTS designates that an audio frame should be presented at a time which has already passed, reacquisition of the audio data will automatically commence to correct the timing error, thus minimizing the duration of the resultant audio artifact.

In the illustrated embodiment, two consecutive audio synchronization words define an audio frame therebetween, including the preceding sync word, but not including the succeeding sync word. The occurrence of errors may be detected in the audio packets. Upon detecting a first audio packet of a current audio frame containing an error, the write pointer for the buffer is advanced by the maximum number of bytes (N) contained in one of the fixed length transport packets. At the same time, the current audio frame is designated as being in error. The subsequent audio packets of the current audio frame are monitored for the next audio synchronization word after the error has been detected. If the synchronization word is not received at the expected point in the audio elementary stream, subsequent data is not stored in the buffer until the sync word is located. Storage of audio data into the buffer is resumed with the next sync word if the next audio synchronization word is located within N bytes after the commencement of the search therefor. If the next audio synchronization word is not located within N bytes after the commencement of the search therefor, a reacquisition of the synchronization condition is commenced. These steps will insure the buffer is maintained at the correct fullness when as many as one transport packet is lost per audio sync frame, even with the sync frame size changes such as with a sample rate of 44.1 ksps, and will resynchronize the audio when too many audio transport packets are lost.

Whenever the audio data from which the television audio is being reconstructed is in error, it is preferable to conceal the error in the television audio. In the illustrated embodiment, a current audio frame is designated as being in error by altering the audio synchronization word for that frame. For example, every other bit of the audio synchronization word can be inverted. The error in the television audio for the corresponding audio frame may then be concealed in response to an altered synchronization word during the decoding and presentation process. This method allows the buffering and error detection process to signal the decoding and presentation process when errors occur via the data itself, without the need for additional interprocess signals.

The audio data can include information indicative of an audio sample rate and audio bit rate, at least one of which is variable. In such a situation, it is advantageous to maintain synchronization within the audio elementary stream during a rate change indicated by the audio data. This can be accomplished by ignoring an audio sample rate change indicated by the audio data on the assumption that the sample rate has not actually changed, and concealing the audio frame containing the data indicative of an audio sample rate change while attempting to maintain the synchronization condition. This strategy will properly respond to an event in which the audio sample rate change or bit rate change indication is the result of an error in the indication itself, as opposed to an actual rate change.

Similarly, audio data can be processed in accordance with a new rate indicated by the audio data in the absence of an error indication pertaining to the audio frame containing the new rate, while attempting to maintain the synchronization condition. The audio data is processed without changing the rate if an error indication pertains to the audio frame containing the new rate. At the same time, the audio frame to which the error condition pertains is concealed while the decoder attempts to maintain the synchronization condition. If the synchronization condition cannot be maintained, a reacquisition of the synchronization condition is commenced, as desired when the sample rate actually changes.

Apparatus in accordance with the present invention acquires audio information carried by a packetized data stream. The apparatus also handles errors contained in the audio information. Means are provided for identifying audio packets in the data stream. An audio elementary stream is recovered from the detected audio packets for storage in a buffer. An audio presentation time stamp (PTS) is located in the detected audio packets. Means responsive to the PTS are provided for commencing the output of audio data from the buffer at a specified time. Means are provided for monitoring the detected audio packets after the output of audio data from the buffer has commenced, in order to locate subsequent audio PTS's for use in governing the output of audio data from the buffer to insure audio is presented synchronous to any other elementary streams of the same program and to maintain correct buffer fullness.

The apparatus can further comprise means for maintaining a PTS pointer with a current PTS value and an address of the buffer identifying where a portion of audio data referred to by the current PTS is stored. Means are provided for replacing the PTS value in the PTS pointer with a new current PTS value after data stored at the address set forth in the PTS pointer has been output from the buffer. The address in the PTS pointer is then replaced with a new address corresponding to a portion of audio data referred to by the new current PTS value. Means responsive to the PTS pointer are provided for suspending the output of data from the buffer when the new address is reached. Means are provided for recommencing the output of data from the buffer at a time derived from the new current PTS value. In the event that the new current PTS value is outside a predetermined range, means provided in the apparatus conceal the audio signal and reestablish synchronization.

In an illustrated embodiment, the audio transport packets have a fixed length of M bytes. The transport packets carry a succession of audio frames each contained wholly or partially in said packets. The audio frames each begin with an audio synchronization word. Means are provided for detecting the occurrence of errors in the audio packets. A write pointer for the buffer is advanced by the maximum number of audio frame bytes per audio transport packet (N) and a current audio frame is designated as being in error upon detecting an error in an audio packet of the current audio frame. Means are provided for monitoring the detected audio packets of the current audio frame for the next audio synchronization word after the error has been detected. If the synchronization word is not received where expected within the audio elementary stream, subsequent audio data is not buffered until the next audio synchronization word is received. This process compensates for too many audio bytes having been buffered when the errored audio packet was detected. Such an event will occur each time the lost packet does not carry the maximum number of possible audio data bytes. Means are provided for resuming the storage of audio data in the buffer if the next audio synchronization word is located within N bytes after the commencement of the search therefor. If the next audio synchronization word is not located within said N bytes after the commencement of the search therefor, the audio timing will be reacquired. In this manner, the size of the sync frames buffered will be maintained including for those frames that are marked as being in error, unless the next sync word is not located where expected in the audio elementary stream to recover from the error before buffering any of the next successive frame. This algorithm allows the decode and presentation processes to rely on buffered audio frames being the correct size in bytes, even when data errors result in the loss of an unknown amount of audio data.

Means can also be provided for concealing error in an audio signal reproduced from data output from the buffer when the data output from the buffer is in error. Means are further provided for altering the audio synchronization word associated with a current audio frame, to signal the decode and presentation process that a particular frame is in error. The concealing means are responsive to altered synchronization words for concealing audio associated with the corresponding audio frame.

Decoder apparatus in accordance with the invention acquires audio information carried by a packetized data stream and handles errors therein. Means are provided for identifying audio packets in the data stream. The successive audio frames are extracted from the audio transport packets. Each audio frame is carried by one or more of the packets, and the start of each audio frame is identified by an audio synchronization word. Means responsive to the synchronization words obtain a synchronization condition enabling the recovery of audio data from the detected audio packets for storage in a buffer. Means are provided for detecting the presence of errors in the audio data. Means responsive to the error detecting means control the flow of data through the buffer when an error is present, to attempt to maintain the synchronization condition while masking the error. Means are provided for reestablishing the audio timing if the controlling means cannot maintain the synchronization condition.

DETAILED DESCRIPTION OF THE INVENTION

Figure 1:
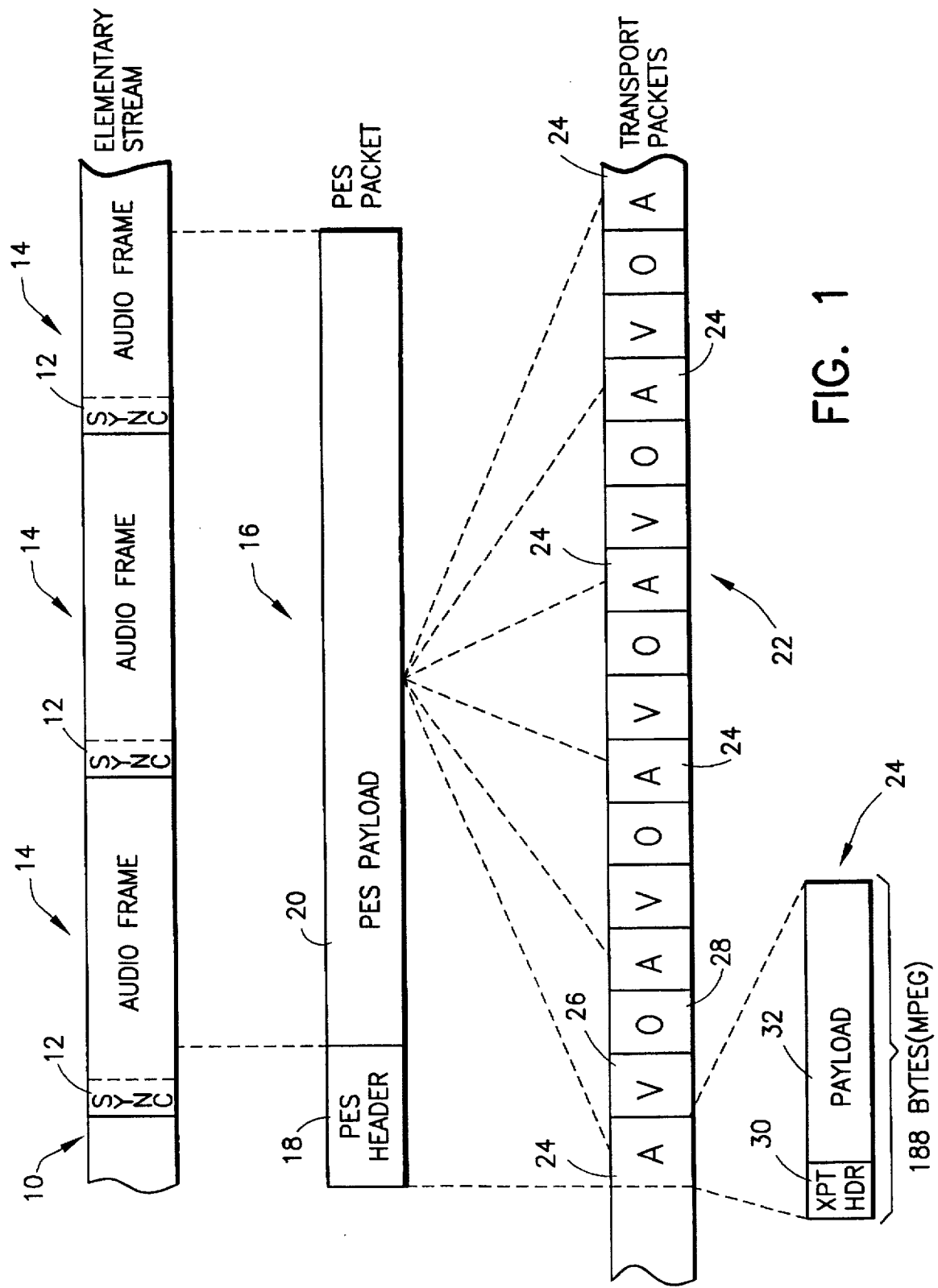
FIG. 1 is a diagrammatic illustration showing how audio transport packets are formed from an elementary stream of audio data.

FIG. 1 is a diagrammatic illustration showing how one or more digital programs can be multiplexed into a stream of transport packets. Multiplexing is accomplished by segmenting elementary streams such as coded video and audio into PES packets and then segmenting these into transport packets. The figure is illustrative only, since a PES packet, such as PES packet 16 illustrated, will commonly translate into other than the six transport packets 24 illustrated.

In the example of FIG. 1, an elementary stream generally designated 10 contains audio data provided in audio frames 14 delineated by synchronization words 12. Similar elementary streams will be provided for video data and other data to be transported.

The first step in forming a transport packet stream is to reconfigure the elementary stream for each type of data into a corresponding packetized elementary stream (PES) formed from successive PES packets, such as packet 16 illustrated. Each PES packet contains a PES header 18 followed by a PES payload 20. The payload comprises the data to be communicated. The PES header 18 will contain information useful in processing the payload data, such as the presentation time stamp (PTS).

The header and payload data from each PES packet are encapsulated into transport packets 24, each containing a transport header 30 and payload data 32. The payload data of the transport packet 24 will contain a portion of the payload data 20 and/or PES header 18 from PES packet 16. In an MPEG implementation, the transport header 30 will contain the packet identifier (PID) which identifies the transport packet, such as an audio transport packet 24, a video transport packet 26, or other data packet 28. In FIG. 1, only the derivation of the audio transport packets 24 is shown. In order to derive video packets 26 and other packets 28, corresponding elementary streams (not shown) are provided which are processed into PES packets and transport packets in essentially the same manner illustrated in FIG. 1 with respect to the formation of the audio transport packets Each MPEG transport packet contains 188 bytes of data, formed from the four-byte transport header 30 and payload data 32, which can be up to 184 bytes. In the MPEG implementation, an adaptation field of, e.g., eight bytes may be provided between the transport header 30 and payload 32. The variable length adaptation field can contain, for example, the program clock reference (PCR) used for synchronization of the decoder system time clock (STC).

The plurality of audio transport packets 24, video transport packets 26 and other packets 28 is multiplexed as illustrated in FIG. 1 to form a transport stream 22 that is communicated over the communication channel from the encoder to the decoder. The purpose of the decoder is to demultiplex the different types of transport packets from the transport stream, based on the PID's of the individual packets, and to then process each of the audio, video and other components for use in reconstructing a television signal.

Figure 2:
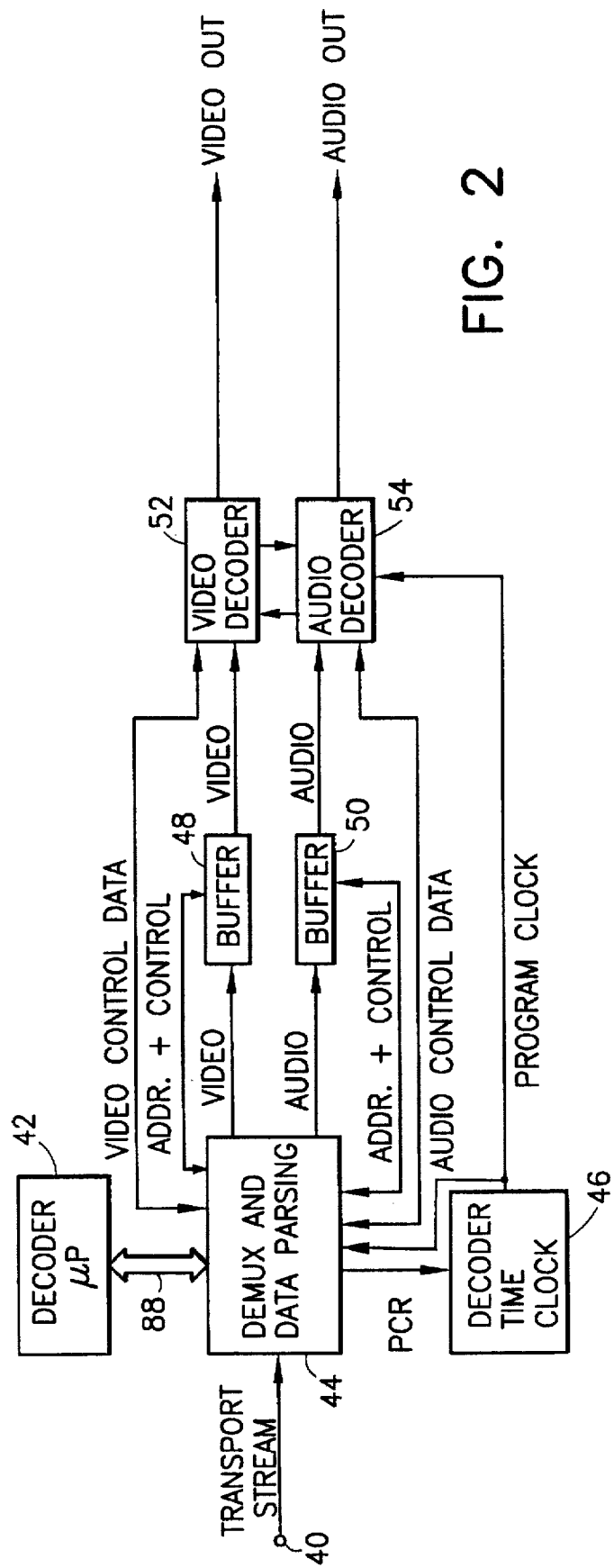
FIG. 2 is a block diagram of decoder apparatus that can be used in accordance with the present invention.

FIG. 2 is a block diagram of a decoder for recovering the video and audio data. The transport stream 22 is input to a demultiplexer and data parsing subsystem 44 via terminal 40. The demultiplexing and data parsing subsystem communicates with a decoder microprocessor 42 via a data bus 88. Subsystem 44 recovers the video and audio transport packets from the transport packet stream and parses the PCR, PTS and other necessary data therefrom for use by other decoder components. For example, PCR's are recovered from adaptation fields of transport packets for use in synchronizing a decoder system time clock (STC) 46 to the system time clock of the encoder. Presentation time stamps for the video and audio data streams are recovered from the respective PES packet headers and communicated as video or audio control data to the video decoder 52 and audio decoder 54, respectively.

Figure 3:
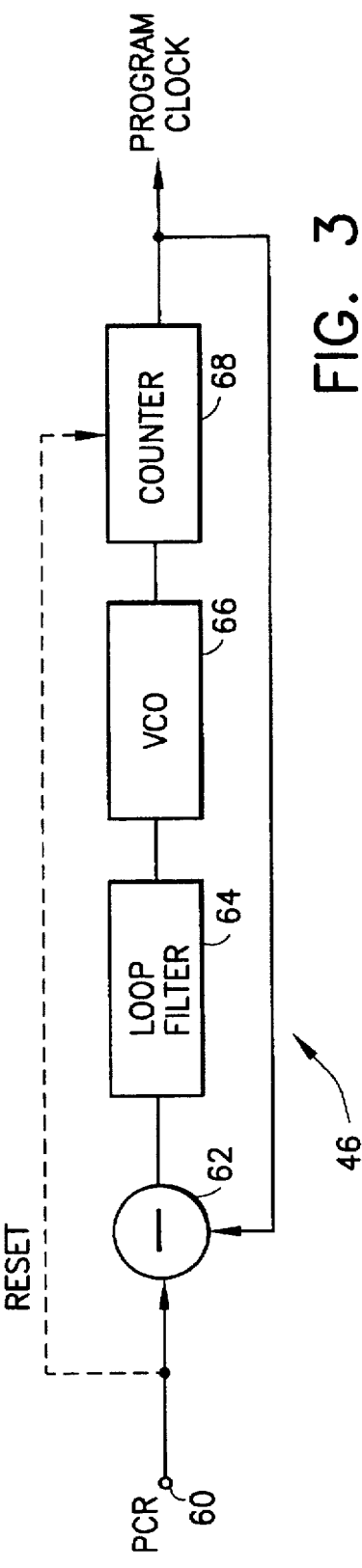
FIG. 3 is a more detailed block diagram of the decoder system time clock (STC) illustrated in FIG. 2.

The decoder time clock 46 is illustrated in greater detail in FIG. 3. An important function of the decoder is the reconstruction of the clock associated with a particular program. This clock is used to reconstruct, for example, the proper horizontal scan rate for the video. The proper presentation rate of audio and video presentation units must also be assured. These are the audio sample rate and the video frame rate. Synchronization of the audio to the video, referred to as "lip sync", is also required.

In order to generate a synchronized program clock, the decoder system time clock (STC) 46 receives the PCR's via terminal 60. Before the commencement of the transport stream decoding, a PCR value is used to preset a counter 68 for the decoder system time clock. As the clock runs, the value of this counter is fed back to a subtracter 62. The local feedback value is then compared with subsequent PCR's in the transport stream as they arrive at terminal 60. When a PCR arrives, it represents the correct STC value for the program. The difference between the PCR value and the STC value, as output from subtracter 62, is filtered by a loop filter 64 and used to drive the instantaneous frequency of a voltage controlled oscillator 66 to either decrease or increase the STC frequency as necessary. The STC has both a 90 kHz and 27 MHz component, and the loop filter 64 converts this to units in the 27 Mhz domain. The output of the VCO 66 is a 27 MHz oscillator signal which is used as the program clock frequency output from the decoder system time clock. Those skilled in the art will recognize that the decoder time clock 46 illustrated in FIG. 3 is implemented using well known phase locked loop (PLL) techniques.

Before beginning audio synchronization, the decoder of FIG. 2, and particularly subsystem 44, will remain idle until it is configured by decoder microprocessor 42. The configuration consists of identifying the type of audio data stream to be processed (e.g., Dolby AC-3 or Musicam audio), identifying the PID of packets from which the audio PCR values are to be extracted, and identifying the PID for audio packets.

During the idle state, subsystem 44 will instruct audio decoder 54 to conceal the audio output. Concealment can be accomplished by zeroing all of the audio samples. Subsequent digital signal processing will result in a smooth aural transition from no sound to sound, and back to no sound. The concealment of the audio output will be terminated when the synchronization process reaches a tracking state. Decoder microprocessor 42 configures the audio format as AC-3 or Musicam, depending on whether audio decoder 54 is an AC-3 or Musicam decoder. Microprocessor 42 determines the audio PID and audio PCR PID from program map information provided in the transport stream. The program map information is essentially a directory of PID's, and is identified via its own PID.

Once the demultiplexer and data parsing subsystem 44 is commanded to enter a Frame Sync state via an acquire command, it will begin searching for two consecutive audio sync words and will supply the decoder microprocessor 42 with the audio sampling rate and audio bit rate indicated within the audio elementary stream. To locate the sync words, subsystem 44 will receive transport packets on the audio PID and extract the PES data, searching for the occurrence of the audio sync word, which is a predetermined, fixed word. For example, the AC-3 audio sync word is 0000 1011 0111 0111 (16 bits) while the Musicam sync word is 1111 1111 1111 (12 bits).

The number of bits between the first bit of two consecutive audio sync words is referred to as the frame size. The frame size depends on whether the audio stream is AC-3 or Musicam and has a different value for each combination of audio sample and bit rate. In a preferred embodiment, subsystem 44 is required to synchronize to AC-3 and Musicam sample rates of 44.1 ksps and 48 ksps. The AC-3 audio syntax conveys the audio sample rate and audio frame size while the Musicam audio syntax conveys the audio sample rate and audio bit rate. Both AC-3 and Musicam specify one sync frame size for each bit rate when the sample rate is 48 ksps. However, AC-3 and Musicam specify two sync frame sizes for each bit rate when the sample rate is 44.1 ksps, a fact which complicates synchronization, especially through packet loss. When the sample rate is 44.1 ksps, the correct sync frame size between the two possibilities is indicated by the least significant bit of the AC-3 frame size code or by a Musicam padding bit.

Once two consecutive audio sync words have been received with the correct number of bytes in between, as specified by the sync frame size, subsystem 44 will store the audio sample rate and audio bit rate implied by the audio syntax for access by the decoder microprocessor 42, interrupting the microprocessor to indicate that subsystem 44 is waiting for the microprocessor to supply it with an audio PTS correction factor. The correction factor is necessary in order to know when to output audio data to the audio decoder 54 during initial acquisition and during tracking for proper lip synchronization. The value is denoted as dPTS. The lip sync value used for tracking is slightly less than that used for initial acquisition to allow for time errors which will exist between any two PTS values, namely that which is used for acquisition and those which are used for tracking.

Decoder microprocessor 42 sets the correction factors such that audio and video will exit the decoder with the same time relationship as it entered the encoder, thus achieving lip synchronization. These correction factors are determined based on audio sample rate and video frame rate (e.g., 60 Hz or 50 Hz). These dependencies exist because the audio decompression processing time required by audio decoder 54 potentially depends on audio sample and bit rate while the video decompression implemented by video decoder 52 potentially depends on video frame rate and delay mode. In a preferred implementation, the PTS correction factors consist of 11 bits, representing the number of 90 kHz clock periods by which audio data is to be delayed before output to the audio decoder 54. With 11 bit values, the delay can be as high as 22.7 milliseconds.

Once the demultiplexing and data parsing subsystem 44 requests the decoder microprocessor 42 to supply the correction factors, it will monitor reception of consecutive sync words at the expected positions within the audio elementary stream. If an error condition occurs during this time, subsystem 44 will transition to searching for two consecutive audio sync words with the correct number of data bytes in between. Otherwise, subsystem 44 remains in State dPTS-wait until the decoder microprocessor services the interrupt from subsystem 44 by writing dPTS$_{acq}$ to subsystem 44.

Once subsystem 44 is provided with the PTS correction factors, it checks whether a transport packet has been received on the audio PCR PID containing a PCR value, carried in the adaptation field of the packet. Until this has occurred, reception of consecutive sync words will continue [State=PCR Acquire]. If an error condition occurs during this time, subsystem 44 will transition to searching for two consecutive audio sync words [State=Frame Sync]. Otherwise, it will remain in State=PCR Acquire until it receives a PCR value on the audio PCR PID.

After a PCR has been acquired, subsystem 44 will begin searching for a PTS [State=PTS Acquire], which is carried in the PES header of the audio transport packets. Until this has occurred, subsystem 44 will monitor the reception of consecutive sync words. If an error condition occurs during this time, it will transition to an error handling algorithm [State=Error Handling]. Otherwise, it will remain in the PTS acquire state until it receives a PTS value on the audio PID.

When subsystem 44 receives an audio PTS value, it will begin searching for reception of the next audio sync word. This is important since the PTS defines the time at which to output the data which begins with the next audio frame. Since audio frames are not aligned with the audio PES, the number of bytes which will be received between the PTS and the next audio sync word varies with time. If an error condition occurs before reception of the next audio sync word, subsystem 44 returns to searching for audio frame synchronization [State=Frame Sync]. It should be appreciated that since audio sync frames and PES headers are not aligned, it is possible for a PES header, and the PTS which it may contain, to be received between the 12 or 16 bits which form an audio sync word. In this case, the sync word to which the PTS refers is not the sync word which is split by the PES header, but rather the following sync word.

When subsystem 44 receives the next sync word, it has acquired PTS. At this point, it will store the received PTS and the PES data (starting with the sync word which first followed the PTS) into an audio buffer 50, together with the buffer address at which it writes the sync word. This stored PTS/buffer address pair will allow subsystem 44 to begin outputting audio PES data to the audio decoder 54 at the correct time, starting with the audio sync word. In a preferred embodiment, the buffer 50 is implemented in a portion of dynamic random access memory (DRAM) already provided in the decoder.

Once subsystem 44 begins buffering audio data, a number of parameters must be tracked which will allow it to handle particular error conditions, such as loss of an audio transport packet to transmission errors. These parameters can be tracked using audio pointers including a PTS pointer, a DRAM offset address pointer, and a valid flag pointer discussed in greater detail below.

After PTS is acquired, subsystem 44 begins waiting to synchronize to PTS [State=PTS Sync]. In this state, the demultiplexer and data parsing subsystem 44 continues to receive audio packets via terminal 40, writes their PES data into buffer 50, and maintains the error pointers. When this state is entered, subsystem 44 compares its audio STC to the correct output start time, which is the PTS value in the PTS pointer plus the acquisition PTS correction factor ($dPTS_{acq}$). If subsystem 44 discovers that the correct time has passed, i.e., PCR>PTS+$dPTS_{acq}$, one or more of the three values is incorrect and subsystem 44 will flag decoder microprocessor 42. At this point, the state will revert to State=Frame Sync, and subsystem 44 will return to searching for two consecutive audio sync words. Otherwise, until PCR=PTS+$dPTS_{acq}$, subsystem 44 will continue to receive audio packets, write their PES data into the buffer 50, maintain the error pointers, and monitor the reception of consecutive sync words.

When PCR=PTS+$dPTS_{acq}$, subsystem 44 has synchronized to PTS and will begin tracking the audio stream [State=Track]. At this time, subsystem 44 will begin transferring the contents of the audio buffer to the audio decoder 54 upon the audio decoder requesting audio data, starting with the sync word located at the buffer address pointed to by the PTS pointer. In the tracking state, subsystem 44 will continue to receive audio packets, write their PES data into the buffer 50, maintain the error pointers, and monitor reception of consecutive sync words. If an error condition occurs during this time, subsystem 44 will transition to error processing. Otherwise, it will remain in State=Track until an error occurs or microprocessor 42 commands it to return to the idle state.

As subsystem 44 outputs the sync word of each sync frame to the audio decoder 54 as part of the "audio" referred to in FIG. 2, it will signal the error status of each audio sync frame to the audio decoder using the sync word. The sync word of audio sync frames in which subsystem 44 knows of no errors will be output as specified by the Dolby AC-3 or Musicam specification, as appropriate. The sync word of audio sync frames in which subsystem 44 knows of errors will be altered relative to the correct sync words. As an example, and in the preferred embodiment, every other bit of the sync word of sync frames to which an error pointer points will be inverted, starting with the most significant bit of the sync word. Thus, the altered AC-3 sync word will be 1010 0001 1101 1101 while the altered Musicam sync word will be 0101 0101 0101. Only the bits of the sync word will be altered. The audio decoder 54 will conceal the audio errors in the sync frame which it receives in which the sync word has been altered in this manner. However, the audio decoder will continue to maintain synchronization with the audio bitstream. Synchronization will be maintained assuming the audio bit rate did not change, and knowing that two sync frame sizes are possible when the audio sample rate is 44.1 ksps.

In accordance with the preferred embodiment, audio decoder 54 will maintain synchronization through sample and bit rate changes if this feature is enabled by the decoder microprocessor 42. If the microprocessor disables sample rate changes, audio decoder 54 will conceal the audio errors in each sync frame received with a sample rate that does not match the sample rate of the sync frame on which the audio decoder last acquired, and will assume that the sample rate did not change in order to maintain synchronization. The audio decoder is required to process through bit rate changes. If an error in the bit rate information is indicated, e.g., through the use of a cyclic redundancy code (CRC) as well known in the art, audio decoder 54 will assume that the bit rate of the corresponding sync frame is the same bit rate as the previous sync frame in order to maintain synchronization. If the decoder microprocessor 42 has enabled rate changes, the audio decoder 54 will assume that the rates indicated in the sync frame are correct, will process the sync frame, and use the appropriate sync frame size in maintaining synchronization with the audio bitstream.

Demultiplexer and data parsing subsystem 44 will also aid microprocessor 42 in checking that audio data continues to be output at the correct time by resynchronizing with the PTS for some PTS values received. To accomplish this, when a PTS value is received it will be stored in the PTS pointer, along with the audio offset address at which the next sync word is written in audio buffer 50, if the PTS pointer is not already occupied. In doing this, subsystem 44 will ensure that the next sync word is received at the correct location in the audio PES bitstream. Otherwise, the PTS value will not be stored and subsystem 44 will defer resynchronization until the next successful PTS/DRAM offset address pair is obtained. Subsystem 44 will store the PTS/DRAM offset address pair in the PTS pointer until it begins to output the associated audio sync frame. Once it begins outputting audio data to the audio decoder 54, subsystem 44 will continue to service the audio decoder's requests for audio data, outputting each audio sync frame in sequence. This will continue until the sync frame pointed to by the PTS pointer is reached. When this occurs, subsystem 44 will stop outputting data to the audio decoder 54 until PCR=PTS+ dPTS$_{track}$. This will detect audio timing errors which may have occurred since the last resynchronization by this method.

If PCR>PTS+dPTS$_{acq}$ when subsystem 44 completes output of the previous sync frame, the audio decoder 54 is processing too slow or an undetected error has occurred in a PCR or PTS value. After this error condition, subsystem 44 will flag microprocessor 42, stop the output to the audio decoder 54, clear audio buffer 50 and the pointers, and return to searching for two consecutive sync words separated by the correct number of audio data bytes. If the audio decoder 54 is not requesting data when the buffer read pointer equals the address pointed to by the PTS pointer, an audio processing error has occurred and subsystem 44 will maintain synchronization with the audio stream, clear its audio buffer and pointers, and return to searching for two consecutive audio sync words [State=Frame Sync].

In order to handle errors, subsystem 44 sets a unique error flag for each error condition, which is reset when microprocessor 42 reads the flag. Each error condition which interrupts microprocessor 42 will be maskable under control of the microprocessor. Table 1 lists the various error conditions related to audio synchronization and the response by subsystem 44. In this table, "Name" is a name assigned to each error condition as referenced in the state diagram of FIG. 5. "Definition" defines the conditions indicating that the corresponding error has occurred. "INT" is an interrupt designation which, if "yes", indicates that subsystem 44 will interrupt microprocessor 42 when this error occurs. "Check State" and "Next State" designate the states in which the error will be detected (checked) and the audio processor will enter, respectively, with the symbol ">" that the designated error will be detected when the audio processing state of subsystem 44 is higher than the designated state. The audio processing state hierarchy, from lowest to highest, is:

1. Idle
2. Frame Sync
3. dPTS$_{wait}$
4. PCR$_{acq}$
5. PTS$_{acq}$
6. PTS Sync
7. Track The symbol "≧" preceding a state indicates that the error will be detected when the audio processing state of subsystem 44 is equal to or higher than the designated state. The designated state(s) indicate(s) that the error will be detected in this state or that the audio processing of subsystem 44 will proceed to this state after the associated actions are carried out. The designation "same" indicates that the audio processing of subsystem 44 will stay in the same state after the associated actions are carried out.

The heading "Buffer Action" indicates whether the audio buffer is to be flushed by setting its read and write pointers to be equal to the base address of the audio buffer. The designation "none" indicates no change from normal audio buffer management.

The heading "Pointer Action" indicates by the term "reset" that the PTS pointer, error pointers or both will be returned to the state specified as if subsystem 44 had been reset. The designation "none" indicates no change from normal pointer management. The designation "see other actions" indicates that other actions under the "Other Actions" heading may indicate a pointer to be set or reset. The "Other Actions" heading states any additional actions required of the subsystem 44 as a result of the error.

TABLE 1

SUMMARY OF ERRORS, EXCEPTIONS, AND ACTIONS.

| Name | Definition | Int | Check State | Next State | Buffer Action | Pointer Action | Other Actions |
|------|------------|-----|-------------|------------|---------------|----------------|---------------|
| pts_err | PCR > PTS + dPTS$_{acq}$ | yes | pts_sync | frame_sync | flush | reset | none |
| pts_err | PCR > PTS + dPTS$_{acq}$ | yes | track | frame_sync | flush | reset | Stop output to Audio Decoder (ADP). |
| sync_err | Input processor loses sync with input audio frames | yes | >idle | frame_sync | flush | reset | Stop output to ADP. |
| ov_err | Audio Buffer overflows | yes | ≥pts_sync | frame_sync | flush | reset | Input processor maintains synchronization with the audio bitstream. Stop output to ADP. |
| under_err | Audio Buffer underflows | no | track | same | none | none | Input processor maintains synchronization with the audio bitstream. Stop output to ADP. |
| fs_err | Input processor reaches Audio PBS data which indicates the audio sample rate has changed since the current PID was acquired | yes | >frame_sync | same | none | none | Continue processing as if the audio sample rate had not changed. |
| fb_err | Input processor receives Audio PES data which indicates the audio bit rate has changed relative to the last audio sync frame reached | yes | >frame_sync | same | none | none | If bit rate changes are enabled, input processor will continue processing, trusting that the bit rate in fact changed and using the appropriate sync frame size to maintain synchronization. If bit rate changes are not enabled, input processor will continue processing using the bit rate indicated by the last audio sync frame received. |
| pts_miss | Sync word not found due to loss of audio data after a PTS is received | no | ≥pts_acquire | same | none | none | None but other error conditions may also apply in this case |
| pcr_dis1 | Input processor reaches a transport packet on the Audio PCR PID with the discontinuity_indicator bit of its adaptation_field set | no | pts_sync | pts acquire | flush | pts:reset error:none | Input processor stops storing PTS values in the PTS pointer until after reception of the next Audio PCR value. |
| pcr_dis2 | Input processor receives a transport packet on the Audio PCR PID with the discontinuity_indicator bit of its adaptation_field set | no | track | same | none | pts:reset error:none | Input processor stops storing PTS values in the PTS pointer until after reception of the next Audio PCR value. |
| aud_err1a | Audio data of one transport packet of the current input sync frame is lost due to errors | See other actions | >idle | same or frame_sync; see other actions | none | pts:none error:see other actions | Maintain Audio Buffer fullness by advancing the FIFO write pointer by 184 bytes (MPEG), use an error pointer to mark the current sync frame as in error, and continue processing without generating an interrupt. If it is possible that more than one audio sync word was lost with the missing audio transport packet, such as when supporting Musicam Layer II at less than 64 kbps or AC-3 at less than 48 kbps, return to the Frame Sync state and generate an interrupt. If the next audio sync word is not received when expected, begin a byte-by-byte search for the audio sync word during the reception of subsequent audio data. Once the sync byte search is started, stop storing audio data in the buffer until the sync word in found. Do not store the first byte examined during the search. Resume storing audio data when the sync byte is found, starting with the sync word itself. If the sync word is not found during the first 184 bytes searched, return to the Frame Sync state[1] and generate an interrupt |

TABLE 1-continued

SUMMARY OF ERRORS, EXCEPTIONS, AND ACTIONS.

| Name | Definition | Int | Check State | Next State | Buffer Action | Pointer Action | Other Actions |
|---|---|---|---|---|---|---|---|
| aud_err1b | Audio data of one transport packet of the current input sync frame is lost due to errors after aud_err1a has occurred during the same input sync frame | yes | >idle | frame_sync | flush | pts:reset error:none | none |
| aud_err2 | Audio data of more than one transport packet of the current input sync frame is lost due to errors | yes | >idle | frame_sync | flush | pts:reset error:see other actions | Use an error pointer to mark the current sync frame as in error. |
| ptrs_full | Audio data of one transport packet is lost while Error Mode is Unprotected | yes | ≥pts_sync | frame_sync | flush | reset | Input processor maintains synchronization with the audio bitstream. Stop output to ADP. |

[1] To implement the above error processing for MPEG or DigiCipher II implementations, the Input Processor can maintain an audio frame byte count by:
setting a counter's value so the sync frame size in bytes as each sync word is received,
decrementing the counter as each received audio byte is stored in the Audio Buffer (FIFO),
decrementing the counter by 184 bytes when a single audio transport packet is lost to compensate for the advancement of the FIFO write pointer by 184,
incrementing the counter by the smaller of the two sync frame sizes in bytes corresponding to the current bit rate if the above decrement resulted in a negative counter value (indicating the lost transport packet possibly contained the next audio sync word and accounting for the possibility that the audio sample rate is 44.1 Ksps and the sync frame size has changed from the larger value to the smaller value), returning to the Frame Sync state if the above increment resulted in a counter value which was still negative (indicating the lost transport packet possibly contained more than one audio sync word), and beginning the byte-by-byte sync word search when the counter is zero.

As indicated above, the demultiplexing and data parsing subsystem 44 of FIG. 2 maintains several pointers to support audio processing. The PTS pointer is a set of parameters related to a PTS value, specifically a PTS value, a DRAM offset address, and a validity flag. In the illustrated embodiment, the PTS value comprises the 17 least significant bits of the PTS value received from the audio PES header. This value is associated with the audio sync frame pointed to by the pointer's DRAM offset address field. The use of 17 bits allows this field to specify a 1.456 second time window $((2^{17}-1)/90$ kHz), which exceeds the maximum audio time span which the audio buffer 50 is sized to store.

The DRAM offset address maintained by the PTS pointer is a 13-bit offset address, relative to the audio buffer base address, into the DRAM at which the first byte of the audio sync frame associated with the pointer's PTS value is stored. The 13 bits allows the pointer to address an audio buffer as large as 8192 bytes.

The PTS pointer validity flag is a one-bit flag indicating whether or not this PTS pointer contains a valid PTS value and DRAM offset address. Since MPEG does not require PTS values to be transported more often than every 700 milliseconds, subsystem 44 may find itself not having a valid PTS value for some intervals of time.

After the decoder is reset, the valid flag of the PTS pointer is set to invalid. When a new PTS value is received, if the valid flag is set, the newly received PTS value is ignored. If the valid flag is not set, the newly received PTS value is stored into the PTS pointer but its valid flag is not yet set to valid. After a new PTS value is stored into the PTS pointer, the processing of audio data is continued and each audio data byte is counted. If the next audio sync frame is received and placed into the buffer correctly, the DRAM offset address (which corresponds to the buffer address into which the first byte of the sync word of this sync frame is stored) is stored into the pointer's DRAM offset address field. Then, the pointer's valid flag is set to valid. The next audio sync frame is received and placed into the buffer correctly when no data is lost for any reason between reception of the PTS value and reception of a subsequent sync word before too many audio bytes (i.e., the number of audio bytes per sync frame) are buffered. If the next audio, sync frame is not received or placed into the buffer correctly, the valid flag is not set to valid.

After the PTS pointer is used to detect any audio timing errors which may have occurred since the last resynchronization, the valid flag is set to invalid to allow subsequent PTS pointers to be captured and used. This occurs whether the PTS pointer is in the PTS sync or tracking state.

The error pointers are parameters related to an audio sync frame currently in the buffer and known to contain errors. The error pointers comprise a DRAM offset address and a validity flag. The DRAM offset address is a 13-bit offset address, relative to the audio buffer base address, into the DRAM at which the first byte of the audio sync frame known to contain errors is stored. Thirteen bits allows the pointer to address an audio buffer as large as 8192 bytes. The validity flag is a one-bit flag indicating whether or not this error pointer contains a valid DRAM offset address. When receiving data from a relatively error free medium, subsystem 44 will find itself not having any valid error pointers for some intervals of time.

Subsystem 44 is required to maintain a total of two error pointers and one error mode flag. After reset, the validity flag is set to invalid and the error mode is set to "protected." When a sync word is placed into the audio buffer, if the valid flag of one or more error pointers is not set, the buffer address of the sync word is recorded into the DRAM offset address of one of the invalid error pointers. At the same time, the error mode is set to protected. If the validity flag of both error pointers is set when a sync word is placed into the buffer, the error mode is set to unprotected but the DRAM offset address of the sync word is not recorded.

When audio data is placed into the buffer and any error is discovered in the audio data, such as due to the loss of an audio transport packet or the reception of audio data which has not been properly decrypted, subsystem 44 will revert to the PTS acquire state if the error mode is unprotected. Otherwise, the validity bit of the error pointer which contains the DRAM offset address of the sync word which starts the sync frame currently being received is set. In the rare event that an error is discovered in the data for an audio sync frame during the same clock cycle that the sync word for the sync frame is removed from the buffer, the sync word will be corrupted as indicated above to specify that the sync frame is known to contain an audio error. At the same time, the validity bit is cleared such that it does not remain set after the sync frame has been output. This avoids the need to reset subsystem 44 in order to render the pointer useful again.

When audio data is being removed from the audio buffer, the sync word is corrupted if the DRAM offset address of any error pointer matches that of the data currently being removed from the buffer. At the same time, the validity bit is set to invalid.

The decoder of FIG. 2 also illustrates a video buffer 58 and video decoder 52. These process the video data at the same time the audio data is being processed as described above. The ultimate goal is to have the video and audio data output together at the proper time so that the television signal can be reconstructed with proper lip synchronization.

Figure 4:
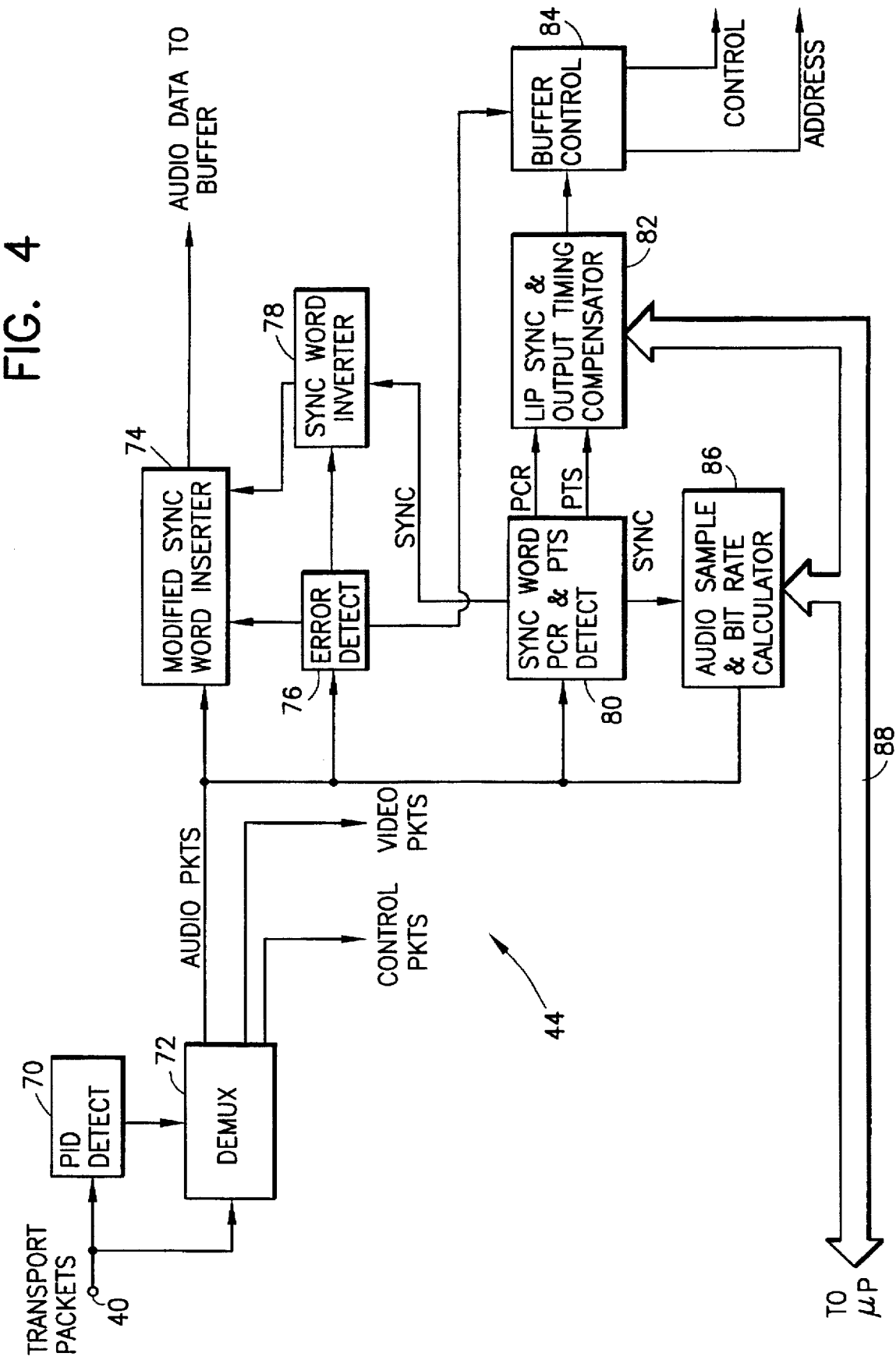
FIG. 4 is a more detailed block diagram of the demultiplexing and data parsing circuit of FIG. 2.

FIG. 4 is a block diagram illustrating the demultiplexing and data parsing subsystem 44 of FIG. 2 in greater detail. After the transport packets are input via terminal 40, the PID of each packet is detected by circuit 70. The detection of the PIDs enables demultiplexer 72 to output audio packets, video packets and any other types of packets carried in the data stream, such as packets carrying control data, on separate lines.

The audio packets output from demultiplexer 72 are input to the various circuits necessary to implement the audio processing as described above. Circuit 74 modifies the sync word of each audio frame known to contain errors. The modified sync words are obtained using a sync word inverter 78, which inverts every other bit in the sync words output from a sync word, PCR and PTS detection circuit 80, in the event that the audio frame to which the sync word corresponds contains an error. Error detection is provided by error detection circuit 76.

The sync word, PCR and PTS detection circuit 80 also outputs the sync word for each audio frame to an audio sample and bit rate calculator 86. This circuit determines the audio sample and bit rate of the audio data and passes this information to decoder microprocessor 42 via data bus 88.

The PCR and PTS are output from circuit 80 to a lip sync and output timing compensator 82. Circuit 82 also receives the dPTS values from microprocessor 42, and adds the appropriate values to the PTS in order to provide the necessary delay for proper lip synchronization. Compensator 82 also determines if the delayed presentation time is outside of the acceptable range with respect to the PCR, in which case an error has occurred and resynchronization will be required.

Buffer control 84 provides the control and address information to the audio output buffer 50. The buffer control 84 is signaled by error detection circuit 76 whenever an error occurs that requires the temporary suspension of the writing of data to the buffer. The buffer control 84 also receives the delay values from lip sync and output timing compensator 82 in order to control the proper timing of data output from the buffer.

Figure 5:
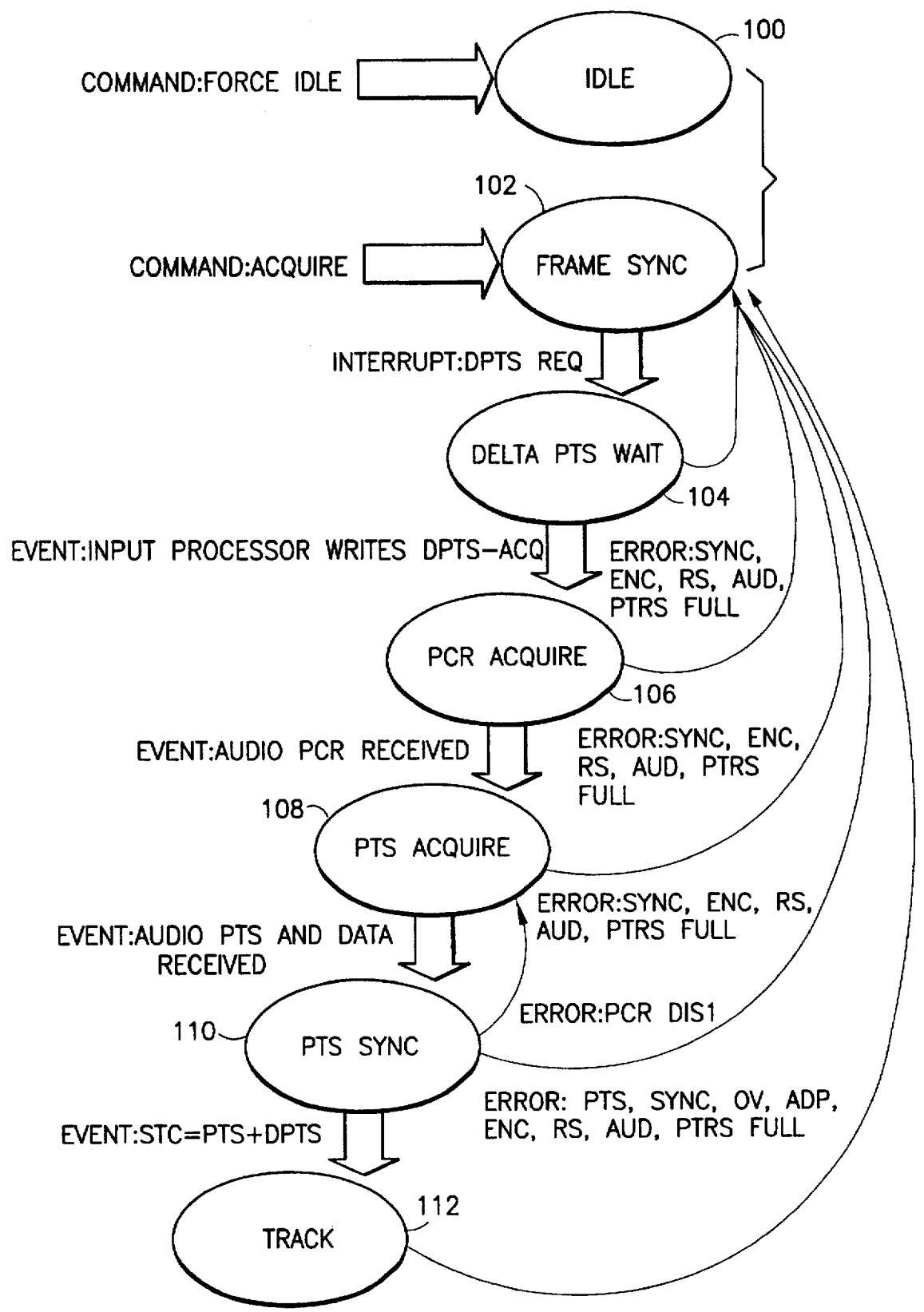
FIG. 5 is a state diagram illustrating the processing of audio data in accordance with the present invention.

FIG. 5 is a state diagram illustrating the processing of audio data and response to errors as set forth in Table 1. The idle state is represented by box 100. Acquisition of the audio data occurs during the frame sync state 102. The dPTS-wait state is indicated by box 104. Boxes 106, 108 and 110 represent the $PCR_{acq}$, $PTS_{acq}$, and PTS sync states, respectively. Once audio synchronization has occurred, the signal is tracked as indicated by the tracking state of box 112. The outputs of each of boxes 104, 106, 108, 110 and 112 indicate the error conditions that cause a return to the frame synchronization state 102. The error PCR DIS1 during the PTS sync state 110 will cause a return to the PTS acquire state, as indicated in the state diagram of FIG. 5.

It should now be appreciated that the present invention provides methods and apparatus for acquiring and processing errors in audio data communicated via a transport packet scheme. Transport packet errors are handled while maintaining audio synchronization. During such error conditions, the associated audio errors are concealed. Corrupted data in an audio frame is signaled by altering the sync pattern associated with the audio frame. PTS's are used to check the timing of processing and to correct audio timing errors.

Although the invention has been described in connection with various specific embodiments, it should be appreciated and understood that numerous adaptations and modifications may be made thereto, without departing from the spirit and scope of the invention as set forth in the claims.

We claim:

1. A method for processing digital audio data from a packetized data stream carrying digital television information in a succession of fixed length transport packets, each of said packets including a packet identifier (PID), some of said packets containing a program clock reference (PCR) value for synchronizing a decoder system time clock (STC), and some of said packets containing a presentation time stamp (PTS) indicative of a time for commencing the output of associated data for use in reconstructing a television signal, said method comprising the steps of:

monitoring the PID's for the packets carried in said data stream to detect audio packets, some of said audio packets carrying an audio PTS;

storing audio data from the detected audio packets in a buffer for subsequent output;

monitoring the detected audio packets to locate audio PTS's;

comparing a time derived from said STC with a time derived from the located audio PTS's to determine whether said audio packets are too early to decode, too late to decode, or ready to be decoded; and adjusting the time at which said stored audio data is output from said buffer on an ongoing basis in response to said comparing step.

2. A method in accordance with claim 1 wherein a PTS pointer is provided to maintain a current PTS value and an address of said buffer identifying where a portion of audio data referred to by said current PTS is stored, said timing adjustment being provided by the further steps of:

replacing said PTS value in said PTS pointer with a new current PTS value after data stored at said address has been output from said buffer;

replacing said address in said PTS pointer with a new address corresponding to a portion of audio data referred to by said new current PTS value;

suspending the output of data from said buffer when said new address is reached; and recommencing the output of data from said buffer when said decoder system time clock reaches a presentation time derived from said new current PTS value.

3. A method in accordance with claim 2 wherein said presentation time is determined from the sum of said new current PTS value and an offset value that provides proper lip synchronization by accounting for a video signal processing delay.

4. A method in accordance with claim 1 wherein the time at which the audio data is output from said buffer is dependent on an offset value added to said PTS for providing proper lip synchronization by accounting for a video signal processing delay.

5. A method in accordance with claim 1 comprising the further steps of:

examining the detected audio packets to locate the occurrence of at least one audio synchronization word therein for use in achieving a synchronization condition prior to locating said audio PTS's;

commencing a reacquisition of said synchronization condition if said comparing step determines that said audio packets are too late to decode.

6. A method in accordance with claim 5 wherein two consecutive audio synchronization words with a correct number of audio data bytes in between define an audio frame, said audio frame including only one of said two consecutive audio synchronization words, said method comprising the further steps of:

detecting the occurrence of errors in said audio packets;

upon detecting a first audio packet of a current audio frame containing an error, advancing a write pointer for said buffer by the maximum number of payload bytes (N) contained in one of said fixed length transport packets and designating said current audio frame as being in error;

monitoring the detected audio packets of said current audio frame for the next audio synchronization word after said error has been detected, and if said synchronization word is not received where expected in the audio stream, discarding subsequent audio data while searching for said synchronization word rather than storing the subsequent audio data into said buffer;

resuming the storage of audio data in said buffer upon detection of said next audio synchronization word if said next audio synchronization word is located within N bytes after the commencement of the search therefor; and if said next audio synchronization word is not located within said N bytes after the commencement of the search therefor, commencing a reacquisition of said synchronization condition.

7. A method in accordance with claim 6 comprising the further step of concealing television audio errors whenever the audio data from which said television audio is being reconstructed is in error.

8. A method in accordance with claim 7 wherein:

a current audio frame is designated as being in error by altering the audio synchronization word for that frame; and said concealing step is responsive to an altered synchronization word for concealing audio associated with the corresponding audio frame.

9. A method for processing digital audio data from a packetized data stream carrying digital television information in a succession of transport packets having a fixed length of N bytes, each of said packets including a packet identifier (PID), some of said packets containing a program clock reference (PCR) value for synchronizing a decoder system time clock, and some of said packets containing a presentation time stamp (PTS) indicative of a time for commencing the output of associated data for use in reconstructing a television signal, said method comprising the steps of:

monitoring the PID's for the packets carried in said data stream to detect audio packets;

examining the detected audio packets to locate the occurrence of audio synchronization words for use in achieving a synchronization condition, each two consecutive audio synchronization words defining an audio frame therebetween;

monitoring the detected audio packets after said synchronization condition has been achieved to locate an audio PTS;

searching the detected audio packets after locating said audio PTS to locate the next audio synchronization word;

storing audio data following said next audio synchronization word in a buffer;

detecting the occurrence of errors in said audio packets;

upon detecting a first audio packet of a current audio frame containing an error, advancing a write pointer for said buffer by N bytes and designating said current audio frame as being in error;

monitoring the detected audio packets of said current audio frame for the next audio synchronization word after said error has been detected, and if said synchronization word is not received where expected in the audio stream, discarding subsequent audio data while searching for said synchronization word rather than storing the subsequent audio data into said buffer;

resuming the storage of audio data in said buffer upon detection of said next audio synchronization word if said next audio synchronization word is located within N bytes after the commencement of the search therefor; and if said next audio synchronization word is not located within said N bytes after the commencement of the search therefor, commencing a reacquisition of said synchronization condition.

10. A method in accordance with claim 9 comprising the further step of concealing television audio errors whenever the audio data from which said television audio is being reconstructed is in error.

11. A method in accordance with claim 10 wherein:

a current audio frame is designated as being in error by altering the audio synchronization word for that frame; and said concealing step is responsive to an altered synchronization word for concealing audio associated with the corresponding audio frame.

12. A method in accordance with claim 9 wherein said audio data includes information indicative of an audio sample rate and audio bit rate, at least one of said audio sample rate and audio bit rate being variable, said method comprising the further step of attempting to maintain synchronization of said audio packets during a rate change indicated by said audio data by:

ignoring a rate change indicated by said audio data on the assumption that the rate has not actually changed;

concealing the audio frame containing the data indicative of an audio sample rate change while attempting to maintain said synchronization condition; and commencing a reacquisition of said synchronization condition if said condition cannot be maintained.

13. A method in accordance with claim 9 wherein said audio data includes information indicative of an audio sample rate and audio bit rate, at least one of said audio sample rate and audio bit rate being variable, said method comprising the further step of attempting to maintain synchronization of said audio packets during a rate change indicated by said audio data by:

processing said audio data in accordance with a new rate indicated by said audio data in the absence of an error indication pertaining to the audio frame containing the new rate, while attempting to maintain said synchronization condition;

processing said audio data without changing the rate if an error indication pertains to the audio frame containing the new rate, while concealing the audio frame to which said error condition pertains and attempting to maintain said synchronization condition; and commencing a reacquisition of said synchronization condition if said condition cannot be maintained.

14. Apparatus for acquiring audio information carried by a packetized data stream and processing errors therein, comprising:

means for detecting audio transport packets in said data stream;

means for recovering audio data from said detected audio transport packets for storage in a buffer;

means for locating an audio presentation time stamp (PTS) in said detected audio transport packets;

means responsive to said PTS for commencing the output of audio data from said buffer at a specified time;

means for monitoring the detected audio transport packets after the output of audio data from said buffer has commenced, to locate subsequent audio PTS's;

means for comparing a time derived from a decoder system time clock (STC) to a time derived from the subsequent audio PTS's to determine whether audio data stored in said buffer is too early to decode, too late to decode, or ready to be decoded; and means responsive to said comparing means for adjusting the time at which said stored audio data is output from said buffer.

15. Apparatus in accordance with claim 14 further comprising:

means for maintaining a PTS pointer with a current PTS value and an address of said buffer identifying where a portion of audio data referred to by said current PTS is stored;

means for replacing said PTS value in said PTS pointer with a new current PTS value after data stored at said address has been output from said buffer, and for replacing said address in said PTS pointer with a new address corresponding to a portion of audio data referred to by said new current PTS value;

means responsive to said PTS pointer for suspending the output of data from said buffer when said new address is reached; and means for recommencing the output of data from said buffer at a time derived from said new current PTS value.

16. Apparatus in accordance with claim 15 further comprising:

means for concealing error in an audio signal reproduced from data output from said buffer and reestablishing the detection of said audio transport packets if the time derived from said new current PTS value is outside a predetermined range.

17. Apparatus in accordance with claim 14 wherein said audio transport packets each contain a fixed number N of payload bytes, said packets being arranged into successive audio frames commencing with an audio synchronization word, said apparatus further comprising:

means for detecting the occurrence of errors in said audio packets;

means for advancing a write pointer for said buffer by N bytes and designating a current audio frame as being in error upon detecting an error in an audio transport packet of said current audio frame;

means for monitoring the detected audio transport packets of said current audio frame for the next audio synchronization word after said error has been detected, and if said synchronization word is not received where expected in the audio stream, discarding subsequent audio data while searching for said synchronization word rather than storing the subsequent audio data into said buffer;

means for resuming the storage of audio data in said buffer upon detection of said next audio synchronization word if said next audio synchronization word is located within said fixed number N of bytes after the commencement of the search therefor; and means for reestablishing the detection of said audio transport packets if said next audio synchronization word is not located within said fixed number N of bytes after the commencement of the search therefor.

18. Apparatus in accordance with claim 17 further comprising:

means for concealing error in an audio signal reproduced from data output from said buffer when the data output from said buffer is in error.

19. Apparatus in accordance with claim 18 further comprising:

means for altering the audio synchronization word associated with a current audio frame to designate that frame as being in error;

wherein said concealing means are responsive to altered synchronization words for concealing errors in audio associated with the corresponding audio frame.

20. Apparatus for acquiring audio information carried by a packetized data stream and processing errors therein, comprising:

means for detecting audio transport packets in said data stream, said packets being arranged into successive audio frames commencing with an audio synchronization word;

means responsive to said synchronization words for obtaining a synchronization condition enabling the recovery of audio data from said detected audio transport packets for storage in a buffer;

means for detecting the presence of errors in said audio data;

means responsive to said error detecting means for controlling the flow of data through said buffer when an error is present, to attempt to maintain said synchronization condition while masking said error; and means for reestablishing the detection of said audio transport packets if said controlling means cannot maintain said synchronization condition.

21. Apparatus in accordance with claim 20 wherein said audio transport packets each contain a fixed number N of payload bytes, and said means responsive to said error detecting means comprise:

means for advancing a write pointer for said buffer by said fixed number N of bytes and designating a current audio frame as being in error upon the detection of an error in an audio transport packet thereof;

means for monitoring the detected audio transport packets of said current audio frame for the next audio synchronization word after said error has been detected, and if said synchronization word is not received where expected in the audio stream, discarding subsequent audio data while searching for said synchronization word rather than storing the subsequent audio data into said buffer; and means for resuming the storage of audio data in said buffer upon detection of said next audio synchronization word if said next audio synchronization word is located within said fixed number N of bytes after the commencement of the search therefor.

22. Apparatus in accordance with claim 20 further comprising:

means for concealing error in an audio signal reproduced from data output from said buffer when the data output from said buffer is in error.

23. Apparatus in accordance with claim 22 further comprising:

means for altering the audio synchronization word associated with an audio frame containing a data error to designate that frame as being in error;

wherein said concealing means are responsive to altered synchronization words for concealing errors in audio associated with the corresponding audio frame.

24. A method for managing errors in data received in bursts from a packetized data stream carrying digital information in a succession of fixed length transport packets, at least some of said packets containing a presentation time stamp (PTS) indicative of a time for commencing the fixed rate presentation of presentation units from a buffer into which they are temporarily stored upon receipt, said method comprising the steps of:

monitoring received packets to locate associated PTS's, said received packets carrying presentation units to be presented;

synchronizing the presentation of said presentation units from said buffer to a system time clock (STC) associated with the packetized data stream using timing information derived from the PTS's located in said monitoring step; and identifying discontinuity errors resulting from a loss of one or more transmitted packets between successive ones of the received packets and, if a discontinuity of no more than one packet is identified, advancing a write pointer of said buffer by a suitable number of bits to compensate for the discontinuity, while maintaining the synchronization of said presentation with respect to said STC.

25. A method in accordance with claim 24 wherein said transport packets each contain a fixed number N of payload bytes, said method comprising the further steps of:

advancing said write pointer by said fixed number N of bytes upon the detection of a discontinuity error;

continuing said monitoring step after said discontinuity error has been detected in order to search for a synchronization word, and if said synchronization word is not located where expected, discarding subsequent presentation units while searching for said synchronization word rather than storing said subsequent presentation units in said buffer; and resuming the storage of presentation units in said buffer upon the detection of said synchronization word if said synchronization word is located within said fixed number N of bytes after the commencement of the search therefor.

* * * * *